US 6,556,893 B2

(12) United States Patent
Kumar et al.

(10) Patent No.: US 6,556,893 B2
(45) Date of Patent: Apr. 29, 2003

(54) ROBOTIC SYSTEM CONTROL

(75) Inventors: Subodha Kumar, Richardson, TX (US); Natarajan Ramanan, Plano, TX (US); Chelliah Sriskandarajah, Plano, TX (US)

(73) Assignees: FSI International, Allen, TX (US); The University of Texas at Dallas, Richardson, TX (US)

(*) Notice: Subject to any disclaimer, the term of this patent is extended or adjusted under 35 U.S.C. 154(b) by 0 days.

(21) Appl. No.: 10/193,926

(22) Filed: Jul. 12, 2002

(65) Prior Publication Data

US 2003/0060931 A1 Mar. 27, 2003

Related U.S. Application Data

(60) Provisional application No. 60/305,395, filed on Jul. 13, 2001.

(51) Int. Cl.[7] .................................................. G06F 19/00
(52) U.S. Cl. ........................ 700/245; 219/497; 318/562
(58) Field of Search .............................. 700/18, 17, 83, 700/86, 245; 709/201; 219/497, 483, 486; 355/73, 75, 55, 77; 701/23; 318/562

(56) References Cited

U.S. PATENT DOCUMENTS

| | | | | |
|---|---|---|---|---|
| 6,226,073 B1 | * | 5/2001 | Emoto ........................ 414/591 |
| 6,304,320 B1 | * | 10/2001 | Tanaka et al. ............... 417/331 |
| 6,359,688 B2 | * | 3/2002 | Akimoto et al. ......... 414/217.1 |
| 6,373,033 B1 | * | 4/2002 | de Waard et al. ............. 74/422 |
| 6,381,365 B2 | * | 4/2002 | Murakawa ................... 700/248 |
| 6,416,635 B1 | * | 7/2002 | Hurwitt et al. ............. 701/208 |
| 6,424,872 B1 | * | 7/2002 | Glanzer et al. ........ 318/568.11 |
| 6,479,991 B1 | * | 11/2002 | Korenaga ................... 29/25.01 |

OTHER PUBLICATIONS

Noborio et al., International workshop on artificial intelligence for industrial application, 1988, IEEE, pp. 351–357.*

Ueyama et al., Coordinate planning using genetic algorithm, 1992, IEEE, pp. 249–254.*

Jeon et al., A generalized approach for the acceleration and deceleration of industrial robots and CNC machine tools, 2000, IEEE, pp. 133–139.*

* cited by examiner

Primary Examiner—William A Cuchlinski, Jr.
Assistant Examiner—McDieunel Marc
(74) Attorney, Agent, or Firm—Baker Botts L.L.P.

(57) ABSTRACT

In an automated processing system, a system controller uses a meta-heuristic technique for identifying an optimal or near-optimal control schedule for controlling movements and operations of a robot. In particular embodiments, the system controller uses a genetic algorithm to breed a control schedule for the robot. In particular embodiments, the system controller dynamically updates the control schedule based on system operation.

30 Claims, 4 Drawing Sheets

ROBOTIC SYSTEM CONTROL

RELATED PATENT APPLICATIONS

The present invention claims priority to U.S. Provisional Patent Application Ser. No. 60/305,395 filed Jul. 13, 2001, entitled Maximizing Throughput in Large Robotic Cells, which is hereby incorporated by reference.

TECHNICAL FIELD OF THE INVENTION

The present invention relates generally to robotic systems and, more particularly, to control schemes for robotic systems.

BACKGROUND OF THE INVENTION

Modern manufacturing systems often employ robots to automate processes. These robotic systems can provide a number of benefits, such as increased production and precision. In semiconductor manufacturing, robotic systems enable the fabrication of sophisticated electronic devices. Because of the extreme costs associated with semiconductor manufacturing systems and the value of the resulting products, a key goal of these systems is the maximization of throughput.

SUMMARY OF THE INVENTION

In accordance with the present invention, techniques for robotic system control are provided. According to particular embodiments, these techniques increase throughput of robotic systems in comparison with previous techniques.

According to a particular embodiment for calculating a control schedule for a robot within a fabrication system, a method determines operating characteristics for steps in a fabrication process, the operating characteristics comprising a robot movement matrix for movements between a plurality of processing stations and processing times for each of the processing stations. The method further identifies a plurality of control schedules each detailing a process for a robot to shuttle wafers between the processing stations, determines fitness for each of the control schedules using the operating characteristics, and mates the control schedules according to the fitness determined for each control schedule to create a resulting generation of control schedules. The method iterates the fitness determining and the mating for a plurality of resulting generations and then selects a chosen control schedule from a final one of the resulting generations based on fitness. Using the chosen control schedule, the method operates the robot.

Embodiments of the invention provide various technical advantages. These techniques, when appropriately implemented, can enhance productivity of robotic systems. Due to the high value of fabricated wafers, even very small improvements in average process times can greatly increase profitability over time. Moreover, certain embodiments provide for self-tuning of robotic systems in response to measured operating characteristics. This can potentially provide even greater productivity increases.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE DRAWINGS

Figure 1:
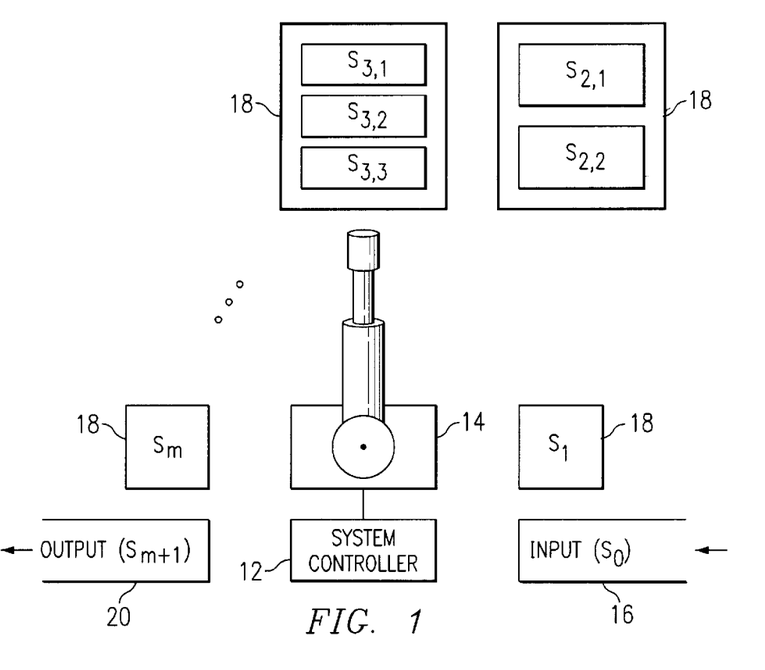
FIG. 1 illustrates a manufacturing system that includes a robotic cell and a controller operating in accordance with particular embodiments of the present invention.

FIG. 1 is a block diagram illustrating a manufacturing system having a robotic cell, indicated at 10, that includes a system controller 12, a robot 14, and a set of stages accessible by robot 14. These stages include an input 16, processing stations 18, and an output 20. In general, cell 10 provides for repetitive production of similar parts, such as semiconductor wafers. To control operation, controller 12 calculates a control schedule designed to maximize throughput and provides the schedule to robot 14. According to particular embodiments, controller 12 may monitor operation of cell 10 and dynamically recalculate the control schedule to further increase throughput.

In the embodiment illustrated, cell 10 is an m-stage flowshop. That is, cell 10 includes m processing stations 18 without buffers at or between stations 18. Robot 14 represents a materials handling device that transfers parts between stations 18. During operation, controller 12 attempts to find a robot moves sequence that maximizes the throughput, equivalent to minimizing the per unit cycle time (hereafter also called "cycle time") or the average time to produce a part in a steady state.

While cell 10 contemplates controller 12 calculating control schedules for any suitable arrangement of robots 14 and stations 18, this discussion focuses on three specific configurations of robotic systems:

Cells with each processing station having one processing unit.

Cells having multiple identical processing units at some of the processing stations (where a processing step may be performed on any of the multiple processing units at that station).

Cells having local material handling devices that are being used to quickly transfer parts between some pairs of adjacent processing stations. This transfers part of the robot's workload to the local material handling device.

FIG. 1 illustrates the second type of system, in which selected stations 18 have multiple identical processing units. In this illustration, the first station 18, labeled $S_1$, includes only a single processing unit; the second station 18 includes two identical processing units, labeled $S_{2,1}$ and $S_{2,2}$; and the third station 18 includes three identical processing units, labeled $S_{3,1}$, $S_{3,2}$, and $S_{3,3}$. Because input 16 may be considered an initial stage, it is labeled $S_0$. Similarly, because output 20 may be considered a final stage, it is labeled $S_{m+1}$.

Since semiconductor manufacturing relies extensively on robotic systems, the following description will focus on the use of control schemes for a wafer fabrication process. However, the disclosed techniques may be suitable for developing control schemes for various other types of system control applications, such as product or parts manufacturing systems. Moreover, the term wafer should be understood to encompass any suitable manufacturing workpiece, such as quartz-based substrates, iron-based substrates, and other suitable substrates. In a semiconductor manufacturing process, robot 14 unloads wafers from, transports them between, and loads them onto, stations 18.

For example, in a three-station robotic cell, each wafer passes through the same sequence of locations from an input tray (I), through stations $S_1$, $S_2$ and $S_3$, and finally into an output tray (O), as in a classical flowshop. After it loads a wafer on a station, the robot either waits for it to finish processing, or moves to another station to unload another wafer when that wafer finishes processing, or moves to the input tray to pick up a new wafer. Any wafer in the cell is always either on one of the stations or it is being handled by the robot. Neither a station nor the robot can be in possession of more than one wafer at any time. Further, the processing of a wafer at a station is nonpreemptive.

To provide steady state operation, cell 10 may employ a cyclic schedule of robot movements. A cyclic schedule of robot moves is one in which the same sequence of states is repeated over and over again. A cycle in such a schedule begins at any given state and ends when that state is encountered next. For a given instant of time, the state of cell 10 is specified by a list of wafers that are in process, where each of these wafers is residing (on robot 14 at a particular location or on one of stations 18), exactly how much work remains to be done at each station 18 for each wafer currently in progress, and the location of robot 14.

In each cycle of a cyclic schedule, one or more wafers will be completed. If q wafers are produced in a cycle, we call the cycle a q-unit cycle. In this case, per unit cycle time (T) equals the total time required to produce q wafers divided by q. We confine our discussion to cyclical schedules and we study the steady state operations of the system under various cyclic scheduling options. Given these conditions, throughput rate is equal to 1/T.

Notations

This description will use the following notation:

$S_1, \ldots, S_m$: the processing stations of the robotic cell, where the indices are in the same order as the processing sequence of wafers. Here, stations $S_i$ and $S_{i+1}$ are called adjacent stations.

I: the input tray. Let us consider I to be the station $S_0$.

O: the output tray. Let us consider O to be the station $S_{m+1}$.

$p_i$: the processing time of a wafer at station $S_i$, i=1,2,...,m.

$l_i$: the time taken by the robot to load a wafer onto station $S_i$, i=1,2,...,m.

$l_{m+1}$: the time taken by the robot to drop a wafer at O.

$u_0$: the time taken by the robot to pick up a wafer at I.

$u_i$: the time taken by the robot to unload a wafer from station $S_i$, i=1,2,...,m.

$S_i^-$ denotes the robot's activity of loading a wafer on station $S_i$ as well as the moment when the wafer is just loaded at $S_i$, i=1,2,...,m.

$S_{m+1}^-$ denotes the robot's activity of dropping a wafer at O and the corresponding moment as above.

$S_i^+$ denotes the robot's activity of unloading a processed wafer from station $S_i$ and the corresponding moment when the wafer is just unloaded from $S_i$, i=1,2,...,m.

$S_0^+$ denotes the robot's activity of picking up a wafer at I and the corresponding moment as above.

$E=(\chi_1, \ldots, \chi_m, S_h^j)$: the current state of the system, where $\chi_i=\phi$ if station $S_i$ is free, and equals $\Omega$ if $S_i$ is occupied by a wafer. The robot has just loaded (respectively, unloaded) station $S_h$ if j=− (respectively, +), for $0 \leq h \leq m+1$.

$w_i$: the waiting time of the robot before unloading a wafer at station $S_i$, i=1,2,...,m.

$t=[t_{i,j}]_{(m+2)\times(m+2)}$ is the robot travel time matrix when robot is moving with a wafer, where the robot travel time from $S_i$ to $S_j$ in this case is denoted by $t_{i,j}$, i=0,1,...,m,m+1 and j=0,1,...,m,m+1.

Similarly, $t'=[t'_{i,j}]_{(m+2)\times(m+2)}$ is the robot travel time matrix when robot is moving without a wafer, where $t'_{i,j}$ denotes the robot travel time between stations $S_i$ and $S_j$ without carrying a wafer.

Single Unit Robotic Cell (SURC)

A single unit robotic cell is the first type of system described above. It has a single processing unit at each station 18. For SURC having m stations that produces a single product type, there are m! one-unit cycles (cyclic schedules). Thus for even a relatively number of stations 18, the number of potential one-unit cycles is vast, and the processing time required to identify the optimum cycle from the set of potential cycles is prohibitive. For example, given a twenty station cell and an analysis time of 1 ms potential cycle, it would take over 70,000 years of processing time to identify the optimum schedule.

The following discussion relates to the operation of controller 12 to find potentially optimal one-unit cycles. The sections relating to SURC describe one-unit robot cycles for SURCs, cycle time derivation for these cycles, a metaheuristic method for calculating near-optimal solutions, and exemplary results based on computational studies.

One-unit Cycles

In a one-unit cycle, the cell returns to the same state after each wafer is produced. Thus, in such a cycle, all the loading activities, $S_i^-$, i=1,2,...,m+1, and all the unloading activities $S_i^+$, i=0,1,...,m, are carried out exactly once. Since the unloading activity of a station $S_i^+$ implies the loading activity of the subsequent station $S_{i+1}^+$, we need only m+1 activities, $S_i^-$, i=1,2,...,m+1 to define a one-unit cycle. $S_{m+1}^-$ is a convenient point to begin the cycle. Since $S_{m+1}^-$ means $S_m^+$, we consider the following m+1 basic activities: $S_m^+, S_1^-, S_2^-, \ldots, S_m^-$. Any two consecutive activities uniquely determine the robot moves between those activities. Therefore, a cycle can be uniquely described by a permutation of m activities: $S_1^-, S_2^{31}, \ldots, S_m^-$. In an optimal cycle, we attempt to ensure that the robot move path is as short as possible. The following are the one-unit robot move cycles for m=2:

$$C_{1,2}: \{S_2^+, S_1^-, S_2^-, S_2^+\} \quad C_{2,2}: \{S_2^+, S_2^-, S_1^-, S_2^+\}$$

We briefly interpret the cycle $C_{2,2}$ by following the sequence of basic activities in $C_{2,2}$ starting with an occurrence of $S_2^+$. It will become clear shortly that the starting initial state of this cycle is as follows: the robot has just unloaded wafer $S_1$ from $S_2$ and $S_1$ is occupied by wafer $P_2$. The robot move sequence includes the following activities: move to O, drop $P_1$ at O, move to $S_1$, if necessary wait until $P_2$ has been processed at $S_1$, unload $P_2$ from $S_1$, move to $S_2$, load $P_2$ on $S_2$, move to I, pick up wafer $P_3$ at I, move to $S_1$, load $P_3$ on $S_1$, move to $S_2$, if necessary wait until $P_2$ has been processed at $S_2$, unload $P_2$ from $S_2$.

There are six robot move cycles for m=3, as shown below:

$C_{1,3}$: $\{S_3^+, S_1^-, S_2^-, S_3^-, S_3^+\}$    $C_{2,3}$: $\{S_3^+, S_1^-, S_3^-, S_2^-, S_3^+\}$ $C_{3,3}$: $\{S_3^+, S_3^-, S_1^-, S_2^-, S_3^+\}$    $C_{4,3}$: $\{S_3^+, S_2^-, S_3^-, S_1^-, S_3^+\}$ $C_{5,3}$: $\{S_3^+, S_2^-, S_1^-, S_3^-, S_3^+\}$    $C_{6,3}$: $\{S_3^+, S_3^-, S_2^-, S_1^-, S_3^+\}$

We interpret the cycle $C_{4,3}$ by following the sequence of basic activities in $C_{4,3}$ starting with an occurrence of $S_3^+$. It will become clear shortly that the starting initial state of this cycle is as follows: the robot has just unloaded a wafer (say $P_1$) from station $S_3$, station $S_1$ has a wafer (say $P_2$), and $S_2$ is free. The cycle consists of the following robot activities: the robot moves to O, drops the wafer $P_1$ at O, moves to $S_1$, if necessary waits at $S_1$ until the wafer $P_2$ on $S_1$ has been processed, unloads $P_2$ from $S_1$, moves to $S_2$, loads $P_2$ on $S_2$, waits at $S_2$ until the wafer $P_2$ has been processed, unloads $P_2$ from $S_2$, moves to $S_3$, loads $P_2$ on $S_3$, moves to I, picks up a wafer (say $P_3$) at I, moves to $S_1$, loads $P_3$ on $S_1$, moves to $S_3$, if necessary waits at $S_3$ until the wafer $P_2$ on $S_3$ has been processed, unloads $P_1$ from $S_3$.

Similarly, there are twenty-four robot move cycles for m=4:

$C_{1,4}$: $\{S_4^+, S_1^-, S_2^-, S_3^-, S_4^-, S_4^+\}$    $C_{2,4}$: $\{S_4^+, S_1^-, S_2^-, S_4^-, S_3^-, S_4^+\}$ $C_{3,4}$: $\{S_4^+, S_1^-, S_4^-, S_2^-, S_3^-, S_4^+\}$    $C_{4,4}$: $\{S_4^+, S_4^-, S_1^-, S_2^-, S_3^-, S_4^+\}$ $C_{5,4}$: $\{S_4^+, S_1^-, S_3^-, S_2^-, S_4^-, S_4^+\}$    $C_{6,4}$: $\{S_4^+, S_1^-, S_3^-, S_4^-, S_2^-, S_4^+\}$ $C_{7,4}$: $\{S_4^+, S_1^-, S_4^-, S_3^-, S_2^-, S_4^+\}$    $C_{8,4}$: $\{S_4^+, S_4^-, S_1^-, S_3^-, S_2^-, S_4^+\}$ $C_{9,4}$: $\{S_4^+, S_3^-, S_1^-, S_2^-, S_4^-, S_4^+\}$    $C_{10,4}$: $\{S_4^+, S_3^-, S_1^-, S_4^-, S_2^-, S_4^+\}$ $C_{11,4}$: $\{S_4^+, S_3^-, S_4^-, S_1^-, S_2^-, S_4^+\}$    $C_{12,4}$: $\{S_4^+, S_4^-, S_3^-, S_1^-, S_2^-, S_4^+\}$ $C_{13,4}$: $\{S_4^+, S_2^-, S_3^-, S_1^-, S_4^-, S_4^+\}$    $C_{14,4}$: $\{S_4^+, S_2^-, S_3^-, S_4^-, S_1^-, S_4^+\}$ $C_{15,4}$: $\{S_4^+, S_2^-, S_4^-, S_3^-, S_1^-, S_4^+\}$    $C_{16,4}$: $\{S_4^+, S_4^-, S_2^-, S_3^-, S_1^-, S_4^+\}$ $C_{17,4}$: $\{S_4^+, S_2^-, S_1^-, S_3^-, S_4^-, S_4^+\}$    $C_{18,4}$: $\{S_4^+, S_2^-, S_1^-, S_4^-, S_3^-, S_4^+\}$ $C_{19,4}$: $\{S_4^+, S_2^-, S_4^-, S_1^-, S_3^-, S_4^+\}$    $C_{20,4}$: $\{S_4^+, S_4^-, S_2^-, S_1^-, S_3^-, S_4^+\}$ $C_{21,4}$: $\{S_4^+, S_3^-, S_2^-, S_1^-, S_4^-, S_4^+\}$    $C_{22,4}$: $\{S_4^+, S_3^-, S_2^-, S_4^-, S_1^-, S_4^+\}$ $C_{23,4}$: $\{S_4^+, S_3^-, S_4^-, S_2^-, S_1^-, S_4^+\}$    $C_{24,4}$: $\{S_4^+, S_4^-, S_3^-, S_2^-, S_1^-, S_4^+\}$

In a cyclic schedule, for a given cycle the cycle time can be derived as follows.

Cycle Time Derivation for SURC

In order to derive the cycle time expressions for the production cycles, we define the state of the system by $E=(\chi_1, \ldots, \chi_m, S_h^j)$, as described above. This state space representation is sufficient for deriving cycle times. Now we consider a cell having two stations and show how the cycle time can be evaluated for two possible cyclic schedules for this case: $C_{1,2}$ and $C_{2,2}$ (see above).

Starting from the initial state $E=(\phi,\phi,S_2^+)$, where the robot has just unloaded a wafer from $S_2$ and $S_1$ is empty, one-unit cycle $C_{1,2}$ includes the following activities: move to O: $(t_{2,3})$, drop the wafer: $(l_3)$, move to I: $(t'_{3,0})$, pick up a wafer (say P): $(u_0)$, move to $S_1$: $(t_{0,1})$, load: $(l_1)$, wait until P has been processed at $S_1$: $(p_1)$, unload: $(u_1)$, move to $S_2$: $(t_{1,2})$, and load: $(L_2)$, wait until P has been processed at $S_2$: $(p_2)$, unload: $(U_2)$. Therefore, the cycle time $T_{1,2}$ for $C_{1,2}$ can be written as:

$T_{1,2}=t_{2,3}+l_3+t'_{3,0}+u_0+t_{0,1}l_1+p_1+u_1+t_{1,2}+l_2+p_2+u_2$

Starting from the initial state $E=(\Omega,\phi,S_2^+)$, where the robot has just unloaded a wafer from $S_2$ and $S_1$ has a wafer, one-unit cycle $C_{2,2}$ includes the following activities: move to O: $(t_{2,3})$, drop the wafer: $(l_3)$, move to $S_1$: $(t'_{3,1})$, if necessary wait for the wafer to be processed on $S_1$: $(w_1)$, unload: $(u_1)$, move to $S_2$: $(t_{1,2})$, and load: $(l_2)$, move to I: $t'_{2,0}$, pick up a wafer: $(u_o)$, move to $S_1$: $(t_{0,1})$, load: $(l_1)$, move to $S_2$: $(t'_{1,2})$, if necessary wait for the wafer: $(w_2)$, unload: $(u_2)$. Hence, the cycle time $T_{2,2}$ for $C_{2,2}$ is given as:

$T_{2,2}=t_{2,3}+l_3+t'_{3,1}+w_1+u_1+t_{1,2}+l_2+t'_{2,0}+u_0+t_{0,1}+l_1+t'_{1,2}+w_2+u_2$

The robot has to wait for the wafer if the wafer is still being processed when the robot comes to unload it. Therefore, a solution $(T_{2,2}, w_1, w_2)$ to the following problem will define a state condition of SURC operating under cycle $C_{2,2}$ for the given cell data:

$T_{2,2}=t_{2,3}+l_3+t'_{3,1}+w_1+u_1+t_{1,2}+l_2+t'_{2,0}+u_0+t_{0,1}+l_1+t'_{1,2}+w_2+u_2$ $w_1=\max\{0, p_1-t'_{1,2}-w_2-u_2-t_{2,3}-l_3-t'_{3,1}\}$ and $w_2=\max\{0, p_2-t'_{2,0}-u_0-t_{0,1}-l_1-t'_{1,2}\}$.

In this case, finding a solution $(T_{2,2}, w_1, w_2)$ is straightforward. Note that the solution for $w_2$ could be obtained from the equation for $w_2$. Then by substituting $w_2$ into the equation for $w_1$, we obtain the solution for $w_1$. Finally, $T_{2,2}$ could be determined by substituting both $w_1$ and $w_2$ into the cycle time formula for $T_{2,2}$. As can be seen below, the cycle time calculation is not always straightforward. Consequently, we propose a linear program method to efficiently find a steady state solution for any given one-unit cycle. Consider the one-unit cycle $C_{6,3}$ (see above).

Starting from the initial state $E=(\Omega,\Omega,\phi,S_3^+)$, where the robot has just unloaded a wafer from $S_3$, and $S_1$ and $S_2$ are occupied by wafers, one-unit cycle $C_{6,3}$ includes the following activities: move to O: $(t_{3,4})$, drop the wafer: $(l_4)$, move to $S_2$: $(t'_{4,2})$, if necessary wait for the wafer to be processed on $S_2$: $(w_2)$, unload: $(u_2)$, move to $S_3$: $(t_{2,3})$, and load: $(l_3)$, move to $S_1$: $(t'_{3,1})$, if necessary wait for the wafer to be processed on $S_1$: $(w_1)$, unload: $(u_1)$, move to $S_2$: $(t_{1,2})$, and load: $(l_2)$, move to I: $(t'_{2,0})$, pick up a wafer: $(u_0)$, move to $S_1$: $(t_{0,1})$, load: $(l_1)$, move to $S_3$: $(t'_{1,3})$, if necessary wait for the wafer at $S_3$: $(w_3)$, unload: $(u_3)$. Hence, the cycle time $T_{6,3}$ for $C_{6,3}$ is given as:

$T_{6,3}=t_{3,4}+l_4+t'_{4,2}+w_2+u_2+t_{2,3}+l_3+t'_{3,1}+w_1+u_1+t_{1,2}+l_2+t'_{2,0}+u_0+t_{0,1}+l_1+t'_{1,3}+w_3+u_3$.

Note that a solution $(T_{6,3}, w_1, w_2, w_3)$ to the following problem Q will define a state condition of SURC operating under cycle $C_{6,3}$ for the given cell data:

Problem Q:

$T_{6,3}=t_{3,4}+l_4+t'_{4,2}+w_2+u_2+t_{2,3}+l_3+t'_{3,1}+w_1+u_1+t_{1,2}+l_2+t'_{2,0}+u_0+t_{0,1}+l_1 t'_{1,3}+w_3+u_3$, $w_1=\max\{0, p_1-t'_{1,3}-w_3-u_3-t_{3,4}-l_4-t'_{4,2}-w_2-u_2-t_{2,3}-l_3-t'_{3,1}\}$, $w_2=\max\{0, p_2-t'_{2,0}-u_0-t_{0,1}-l_1-t'_{1,3}-w_3-u_3-t_{3,4}-l_4-t'_{4,2}\}$ and $w_3=\max\{0, p_3-t'_{3,1}-w_1-u_1-t_{1,2}-l_2-t'_{2,0}-u_0-t_{0,1}-l_1-t'_{1,3}\}$.

It is obvious that the solution to the following linear program provides a steady state solution to problem Q.

Linear Program:

Min $T_{6,3}=t_{3,4}+l_4+t'_{4,2}+w_2+u_2+t_{2,3}+l_3+t'_{3,1}+w_1+u_1+t_{1,2}+l_2+t'_{2,0}+u_0+t_{0,1}+l_1+t'_{1,3}+w_3+u_3$

S.t $w_1 \geq p_1-t'_{1,3}-w_3-u_3-t_{3,4}-l_4-t'_{4,2}-w_2-u_2-t_{2,3}-l_3-t'_{3,1}$ $$w_2 \geq p_2 - t'_{2,0} - u_0 - t_{0,1} - l_1 - t'_{1,3} - w_3 - u_3 - t_{3,4} - l_4 - t'_{4,2}$$

$$w_3 \geq p_3 - t'_{3,1} - w_1 - u_1 - t_{1,2} - l_2 - t'_{2,0} - u_0 - t_{0,1} - l_1 - t'_{1,3}$$

$$w_1, w_2, w_3 \geq 0$$

Therefore, for a given robot move cycle, we determine a steady state solution by solving the linear program.

Genetic Algorithm for SURC

According to particular embodiments, controller 12 uses a process of evolution to identify optimal or near-optimal control schedules for robot 14. That is, controller 12 applies a genetic algorithm (GA) to "breed" superior control schedules. For the SURC scheduling problem, controller 12 views sequences of loading stations 18 as chromosomes (the candidate schedules or solutions). For example, for a cell with six stations, the chromosome corresponding to the robot move cycle $\{S_6^-, S_3^-, S_2^-, S_1^-, S_4^-, S_6^-, S_5^-, S_6^+\}$ is 3 2 1 4 6 5. These chromosomes are members of a population. Each chromosome is characterized (merited) by its fitness. Controller 12 measures the fitness of a chromosome by the associated value of the cycle time (evaluated by the linear program as explained above). Controller 12 iteratively works with the members of the population, with each new iteration referred to as a generation.

Controller 12 uses the following parameters for the evolution of solutions in the SURC problem: elite fraction (ef), population size (ps), the probability of crossing two parents ($p_c$), the probability of mutation ($p_m$) and the number of generations ($n_{gen}$). Moreover, when dealing with a chromosome, such as 1 4 6 2 3 5, the different holding positions are known as alleles. Thus, the second allele in this sequence has the value 4 which means "load station $S_4$" ($S_4^-$). In applying the parameters, controller 12 attempts to balance exploration of the solution space and exploitation of the features of good solutions or sequences produced along the way. While particular values for different parameters may affect operation in varying degrees, controller may experience suitable operation using numbers in the range of the following values: ps=100, $P_c$=0.95, $p_m$=0.1 and ef=0.25. However, while specific values are provided, controller 12 may use any appropriate values for these parameters during operation.

Controller 12 uses a process of selection during analysis. Controller 12 uses selection in an attempt to minimize the cycle time. Controller 12 uses selection to propagate high fitness characteristics in the population and to eliminate the weaker chromosomes from the population, keeping the search directed towards the minimization of cycle time. According to particular embodiments, controller 12 performs selection by identifying the elite (chromosome having better fitness solutions) in the population and then reproducing them in proportion of their relative fitness. The parameter, ef (elite fraction) controls what upper fraction of the population is treated as the elite.

Figure 2:
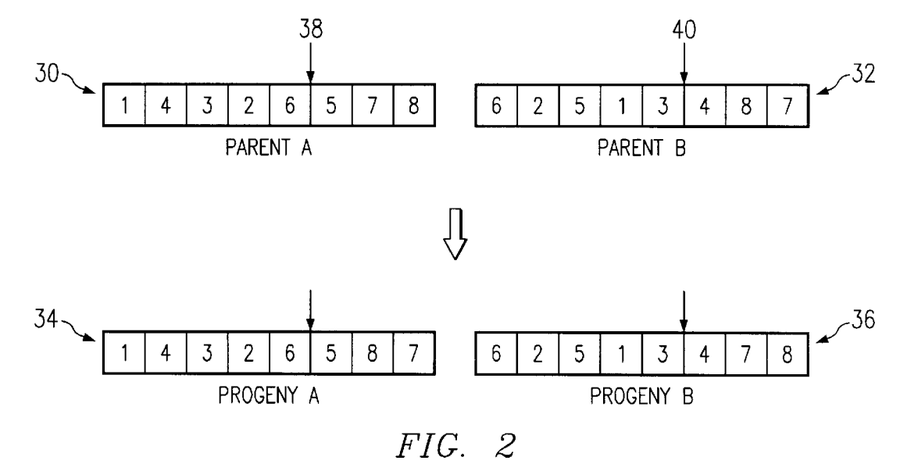
FIG. 2 is a diagram illustrating a crossover operation performed by the controller.

FIG. 2 illustrates a crossover operation used to mate pairs of control schedules represented as chromosomes to produce progeny. In the illustrated operation, controller 12 performs a crossover operation between a parent A, indicated at 30, and a parent B, indicated at 32. Because controller 12 is attempting to generate a control schedule, it should implement crossover to prevent infeasible solutions (sequences of loading stations) from being created. The illustrated crossover technique satisfies this constraint.

In a robotic cell scheduling problem each allele in a chromosome is a unique integer between 1 and m. An example of two parents for m=8 are 1 4 3 2 6 5 7 8 and 6 2 5 1 3 4 8 7. The crossover of parent A and parent B illustrates a one-point crossover. From these two parents, controller 12 generates two progeny, A and B, indicated at 34 and 36 respectively. First, controller 12 randomly selects a crossover point. In the example illustrated, controller 12 has selected the fifth allele, as indicated at 38 and 40. Then, controller 12 fills the first five alleles of progeny A from parent A in order. Similarly, controller 12 fills the first five alleles of progeny B from parent B in order. Controller 12 completes progeny A by filling the three remaining slots with the stations 5-8-7, in the order from parent B. Similarly, controller 12 completes progeny B by filling the three remaining positions with the stations 4-7-8, in the order from parent A.

After producing progeny, controller 12 potentially mutates the progeny produced. Mutation allows the emergence of new solutions to improve the chances of finding better solutions. According to particular embodiments, if controller 12 determines to mutate the progeny, it uses an arbitrary two-allele change mutation. That is, controller 12 causes two alleles to exchange positions. The positions need not be adjacent, since they are selected randomly. Consider mutation of chromosome 1 4 3 2 6 5 8 7 in which controller 12 randomly selects two positions, the second and fifth alleles. Through mutation, the chromosome becomes 1 6 3 2 4 5 8 7. However, while particular techniques for selection, crossover, and mutation are provided above, cell 10 contemplates controller 12 using any suitable techniques for performing these operations.

Figure 3:
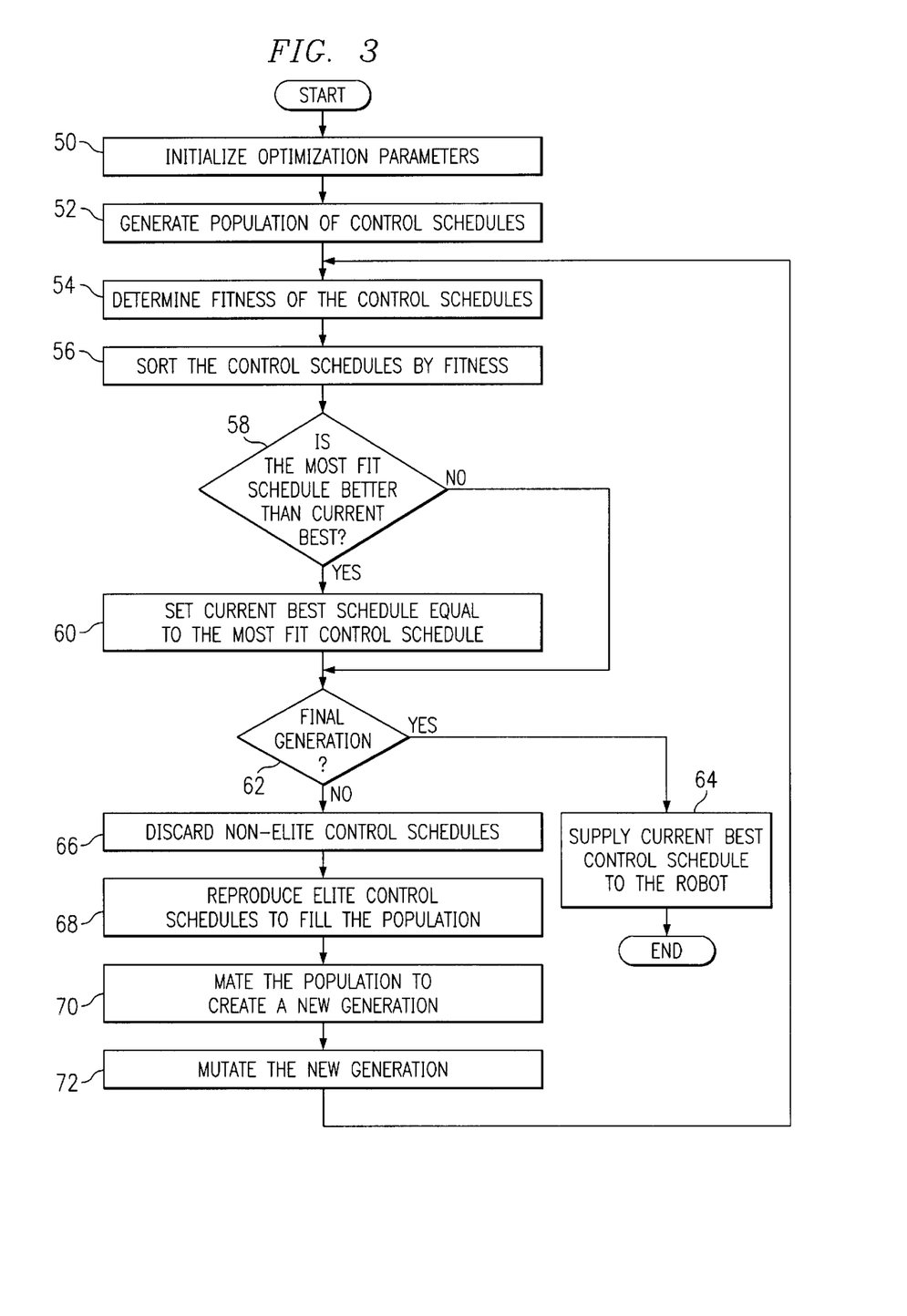
FIG. 3 is a flowchart illustrating exemplary operation of the controller in determining a control schedule for a robot.

FIG. 3 is a flowchart illustrating the exemplary operation of controller 12 in determining a control schedule for use by robot 14. In executing this technique, controller 12 generates ps random sequences of loading the stations for generation zero and evolves the population of solutions for a given number of generations, $n_{gen}$. During the evolution, controller 12 maintains the population size constant at a prespecified value of ps and tracks the best solution found at each generation. For this discussion, the overall best sequence found is denoted by $\sigma^*$, and the corresponding fitness value by $f^*$. Let $\sigma_{ij}$ be the $i^{th}$ sequence in generation j and the corresponding fitness value be $f_{ij}$.

Controller 12 initializes optimization paramters at step 50. For example, controller 12 may determine values for ps, $p_c$, $p_m$, ef: $n_{gen}$ and set j=0 and f*=M, a very large number. Controller 12 generates a population of control schedules at step 52. For example controller may generate ps random sequences, $\sigma_{ij}$,i=1, . . . ,ps, of loading the stations for generation j. Controller then determines fitness for each of the control schedules at step 54. For example, controller 12 may use a linear program as detailed above to find the fitness value (that is, steady state cycle time) for each sequence $\sigma_{ij}$ in generation j.

Based on the determined fitness levels, controller 12 sorts the control schedules. For example, controller 12 may sort all the sequences in generation j in increasing order of their fitness values. Using the determined fitness levels, controller 12 determines whether the most fit control schedule of the current generation is the best (most fit) control yet encountered at step 58. If so, controller 12 sets the current best control schedule equal to the most fit of the current generation at step 60. Whether or not the most fit schedule is selected at step 58, controller 12 determines whether the current generation is the final generation at step 62. If so, controller 12 supplies the current best control schedule to robot 14 at step 64.

However, if this is not the final generation, controller 12 creates a new generation for analysis. To create the new generation, controller 12 first discards non-elite control schedules from the population at step 66. For example, controller 12 may keep the ef upper fraction of the population of generation j and remove others from the population. Controller 12 then reproduces the selected elite control schedules to fill the population at step 68. In this step, controller 12 may reproduce the selected sequences in proportion of their relative fitness such that the total number of sequences in population is again ps.

Controller 12 then mates the population to create a new generation at step 70. To mate members of the population, for example, controller 12 randomly selects two control schedules in generation j according to their relative fitness and performs crossover with the selected control schedules to obtain two children. By performing this operation ps/2 times, controller 12 creates a new generation of control schedules with a population size of ps. After creating a new generation, controller 12 potentially mutates members of the new generation at step 72. For example, using mutation probabilities, controller 12 may identify particular control schedules and mutate those schedules.

After creating a new generation, controller 12 again determines fitness of the population and potentially selects the most fit from the population at steps 54 through 60. This process repeats until controller 12 identifies the final generation at step 62. Thus, the flowchart and the preceding description outline the operation of controller 12 in calculating a control schedule using a genetic algorithm. However, the flowchart and accompanying description illustrate only an exemplary method of operation, and cell 10 contemplates controller 12 using any suitable techniques and elements for this analysis. Therefore, many of the steps in this flowchart may take place simultaneously and/or in different orders that as shown. In addition, controller 12 may use methods with additional steps, fewer steps, and/or different steps, so long as the methods remain appropriate.

Computational Studies for SURC

According to particular embodiments, controller 12 implements a "longest waiting pair" (LWP) scheduling algorithm to control the operation of robot 14. For longest waiting pair scheduling, controller 12 tracks (a) the wafers that are completed at stations 18 and waiting to be moved, and (b) empty stations 18 waiting to receive wafers. Controller 12 selects the wafer and station combination that has the largest total waiting period to service. The effectiveness of using the genetic algorithm described compared to the effectiveness of the longest waiting pair scheduling can be analyzed with respect to random scenarios.

We analyze the results of controller 12 using the genetic algorithm as compared with longest waiting pair scheduling for twenty randomly generated problems. Random problems are generated for four different values of m as m=8, 12, 16 and 20. For each m, five different problems are generated randomly. For all the stations, the processing times are generated randomly using a uniform distribution. The range of this distribution is taken in such a way so that it is close to reality. Table 1 shows the results for randomly generated problems.

TABLE 1

Improvements using GA over LWP for random problems in SURC

| Number of Stations (m) | Increase in number of wafers/shift using GA over LWP | | | % improvement using GA over LWP | | | Avg CPU Time for LWP (in sec.) | Avg CPU Time for GA (in sec.) |
|---|---|---|---|---|---|---|---|---|
| | Max | Avg | Min | Max | Avg | Min | | |
| 8  | 4.80  | 4.64 | 4.0 | 2.26 | 2.16 | 1.95 | 10.2 | 83.15 |
| 12 | 14.4  | 8.32 | 4.8 | 6.90 | 3.93 | 2.13 | 18.2 | 365.08 |
| 16 | 9.60  | 6.14 | 4.0 | 4.62 | 2.91 | 1.95 | 28.0 | 586.43 |
| 20 | 20.0  | 8.16 | 2.4 | 1.21 | 4.01 | 1.07 | 45.6 | 403.66 |

Number of wafers produced is calculated as follows: number of wafers/hour=

$$\frac{3600}{CycleTime\ in\ sec.}.$$

In the table number of wafers/shift=(number of wafers/hour×8) as each shift is considered to be 8 hours long and % improvement using GA over LWP=

$$\frac{\text{Number of wafers/hr using } GA - \text{Number of wafers/hr using } LWP}{\text{Number of wafers/hr using } LWP}.$$

In each row, Max, Avg and Min columns show the maximum, average and minimum values, respectively, among the five randomly generated problems for that row. Average CPU times are also calculated similarly.

In a semiconductor setting, the wafers produced are very costly. Therefore, even a small increase in throughput leads to a substantial increase in revenue. Table 1 shows that the increase in average number of wafer/shift (4.6 to 8.3 wafers/shift) is substantial for all different problem instances. The average percentage improvement varies between 2–4%.

Multiple Unit Robotic Cell (MURC)

FIG. 1 illustrates a multiple unit robotic cell, with the second and third stations each having multiple instances of processing units. Thus, in multiple unit robotic cells, some of the stations have multiple identical processing units in order to increase the throughput. If some of the stations have high processing times, then using multiple processing units is a very useful way of obtaining increased throughput. Because of the differences from single unit robotic cells, the following discussion uses some additional notations to represent stations 18 having multiple processing units. Let $S_{i,j_i}$ denote the $j_i^{th}$ unit at station $S_i$, where i=1, . . . ,m; $j_i$=1, . . . ,$v_i$. $v_i$ denotes the number of multiple identical processing units at station $S_i$.

For multiple unit robotic cells, the number of potential one-unit cycles increases much faster than for single unit robotic cells. Consider a manufacturing process which consists of three sequential operations performed by three different stations $S_1$, $S_2$, $S_3$. A cell for performing the operations includes two identical processing units at station $S_2$ (called $S_{2,1}$, $S_{2,2}$) and one unit each for $S_1$ and $S_3$. Since we have a total of four processing units, there are 4!=24 one-unit cycles. However, some cycles are not feasible. Consider, for example, cycle $\{S_3^+, S_{2,1}^-, S_{2,2}^-, S_1^-, S_3^-, S_3^+\}$ is not feasible as consecutive loading of wafers on the second station processing units $S_{2,1}$ and $S_{2,2}$ is not possible. In order to avoid infeasible cycles, particular embodiments of controller 12 use robot move cycles called the Least Common Multiple Cycles (LCM-unit cycles) during analysis, where LCM is set equal to the least common multiple (LCM) of $v_i$, i=1, . . . , m.

Least Common Multiple (LCM)-unit Cycles

In our approach to construct LCM-unit cycles, we concern ourselves primarily with the robot move sequences associated with one-unit cycles for SURC. A one-unit cycle can be specified by a sequence of states of the robotic cell. For example, consider a one-unit cycle $C_{10,4}$: $\{S_4^+, S_3^-, S_1^-, S_4^-, S_2^-, S_4^+\}$, where m=4. Since this sequence of states uniquely defines the required robot move sequence, we shall also use $C_{10,4}$ to denote the robot move sequence associated with the cycle. The LCM-unit cycle obtained from one-unit robot move sequence $C_{x,y}$ is denoted by $\Gamma_{x,y}$. An LCM-unit cycle is a concatenation of n nearly identical one-unit robot move sequences in the following manner, where n is the LCM $v_i$, i=1, . . . , m. That is, $\Gamma_{x,y}$ is a robot move sequence where sequence $C_{x,y}$ repeats itself successively exactly n times. Consider an example with m=4, $v_1$=3, $v_2$=2, $v_3$=1, $v_4$=2. Thus LCM (n) of $v_1$, $v_2$, $v_3$ and $v_4$ is 6, i.e., n=6. Now we provide the LCM-unit cycle corresponding to one-unit cycle $C_{10,4}$: $\{S_4^+, S_3^-, S_1^-, S_4^-, S_2^-, S_4^{30}\}$. From this, we can construct the associated LCM-unit cycle $\Gamma_{x,y}$ as follows: $\Gamma_{x,y} = \{C_{10,4}^1, C_{10,4}^2, C_{10,4}^3, C_{14,0}^4, C_{10,4}^5, C_{10,4}^6\}$, where $$C_{10,4}^1 = \{S_{4,1}^+, S_{3,1}^-, S_{1,1}^-, S_{4,1}^-, S_{2,1}^-\}$$

$$C_{10,4}^2 = \{S_{4,2}^+, S_{3,1}^-, S_{1,2}^-, S_{4,2}^-, S_{2,2}^-\}$$

$$C_{10,4}^3 = \{S_{4,1}^+, S_{3,1}^-, S_{1,3}^-, S_{4,1}^-, S_{2,1}^-\}$$

$$C_{10,4}^4 = \{S_{4,2}^+, S_{3,1}^-, S_{1,1}^-, S_{4,2}^-, S_{2,2}^-\}$$

$$C_{10,4}^4 = \{S_{4,1}^+, S_{3,1}^-, S_{1,2}^-, S_{4,1}^-, S_{2,1}^-\}$$

$$C_{10,4}^6 = \{S_{4,2}^+, S_{3,1}^-, S_{1,3}^-, S_{4,2}^-, S_{2,2}^-\}$$

In order to precisely define an LCM-unit cycle, we specify the processing unit from which the robot unloads the wafer if there are multiple processing units at one station 18. If station 18 has multiple processing units, then the earliest loaded processing unit is unloaded at that station. For example, $S_{3,1}^-$ in $C_{10,4}^2$, a implies that the robot loads the processing unit 1 at station $S_3$. To perform this activity, robot unloads the wafer from earliest loaded processing unit at station $S_2$.

Let us consider another example with m=3, $v_1$=1, $v_2$=2, $v_3$=2. Thus LCM (n) of $v_1$, $v_2$ and $v_3$ is 2 and n=2. Now we provide the LCM-unit cycle corresponding to one-unit cycle $C_{4,3}$: $\{S_3^-, S_2^-, S_3^-, S_1^-, S_3^-\}$. From this one-unit cycle, we can construct the associated LCM-unit cycle $\Gamma_{x,y}$ as follows: $\Gamma_{x,y} = \{C_{4,3}^1, C_{4,3}^2\}$, where $$C_{4,3}^1 = \{S_{3,1}^+, S_{2,1}^-, S_{3,1}^-, S_{1,1}^-\},$$

$$C_{4,3}^2 = \{S_{3,2}^+, S_{2,2}^-, S_{3,2}^-, S_{1,1}^-\}.$$

We briefly interpret the LCM-unit cycle $\Gamma hd\ x,y$ by following the sequence of basic activities in $\Gamma_{x,y}$ starting with an occurrence of $S_{3,1}^+$. It will become clear shortly that the starting initial state of this cycle is as follows: the robot has just unloaded a wafer (say $P_1$) from $S_{3,1}$, $S_{1,1}$ has a wafer (say $P_4$), $S_{2,2}$ has a wafer (say $P_3$), $S_{3,2}$ has a wafer (say $P_2$), and $S_{2,1}$ is free. The cycle consists of the following robot activities: the robot moves to O, drops the wafer $P_1$ at O, moves to $S_{1,1}$, if necessary waits at $S_{1,1}$ until the wafer $P_4$ on $S_{1,1}$ has been processed, unloads $P_4$ from $S_{1,1}$, moves to $S_{2,1}$, loads $P_4$ on $S_{2,1}$, moves to $S_{2,2}$, if necessary waits at $S_{2,2}$ until the wafer $P_3$ on $S_{2,2}$ has been processed, unloads $P_3$ from $S_{2,2}$, moves to $S_{3,1}$, loads $P_3$ on $S_{3,1}$, moves to I, picks up a wafer (say $P_5$) at I, moves to $S_{1,1}$, loads $P_5$ on $S_{1,1}$, moves to $S_{3,2}$, if necessary waits at $S_{3,2}$ until the wafer $P_2$ on $S_{3,2}$ has been processed, unloads $P_2$ from $S_{3,2}$, moves to O, drops the wafer $P_2$ at O, moves to $S_{1,1}$, if necessary waits at $S_{1,1}$, until the wafer $P_5$ on $S_{1,1}$ has been processed, unloads $P_5$ from $S_{1,1}$, moves to $S_{2,2}$, loads $P_5$ on $S_{2,2}$, moves to $S_{2,1}$, if necessary waits at $S_{2,1}$ until the wafer $P_4$ on $S_{2,1}$ has been processed, unloads $P_4$ from $S_{2,1}$, moves to $S_{3,2}$, loads $P_4$ on $S_{3,2}$, moves to I, picks up a wafer (say $P_6$) at I, moves to $S_{1,1}$, loads $P_6$ on $S_{1,1}$, moves to $S_{3,1}$, if necessary waits at $S_{3,1}$ until the wafer $P_3$ on $S_{3,1}$ has been processed, unloads $P_3$ from $S_{3,1}$.

Cycle time derivation for MURC is similar to SURC, with the difference being that the former uses LCM-unit cycles and the latter uses one-unit cycles. Here, per unit cycle time=

$$\frac{CycleTime\ of\ LCM}{LCM}.$$

Genetic Algorithm for MURC

According to particular embodiments, controller 12 uses a process of evolution similar to that described above with respect to single unit robotic cells to identify optimal or near-optimal control schedules for robot 14 in a multiple unit robotic cell. In the case of multiple unit robotic cells, chromosomes represent information in the same manner as used above with respect to single unit robotic cells. For example, the chromosome for a robot move cycle $\{S_4^+, S_3^-, S_1^-, S_4^-, S_2^-, S_4^+\}$ is 3 1 4 2. However, unlike single unit robotic cells, the fitness (that is, cycle time) of a chromosome is measured here by constructing the associated LCM-unit cycle from the one-unit cycle corresponding to that chromosome. Thus, for multiple unit robotic cells, controller 12 applies a similar genetic algorithm to that used for single unit robotic cells. However, in analyzing fitness of each chromosome, controller 12 uses the associated LCM-unit cycle to analyze fitness for multiple unit robotic cells, while using the linear program to analyze fitness for single unit robotic cells.

Computational Studies for MURC

For computational studies, we use the same random problems as used above with respect to Table 1, but increase the number of processing units at some of stations 18. In order to increase the throughput, the number of processing units should be increased at bottleneck stations 18. Therefore, the number of processing units at station $S_i$ ($v_i$) is calculated roughly using the following formula: $v_i = (p_i *$ Expected Throughput). In practice, the expected throughput is the desired output rate requested by the customers. Table 2 shows the results for randomly generated problems.

TABLE 2

Improvements using GA over LWP for random dataset in MURC

| Number of Stations | Increase in number of wafers/shift using GA over LWP | | | % improvement using GA over LWP | | | Avg CPU Time for LWP | Avg CPU Time for GA |
|---|---|---|---|---|---|---|---|---|
| (m) | Max | Avg | Min | Max | Avg | Min | (in sec.) | (in sec.) |
| 8 | 18.4 | 11.68 | 2.4 | 4.02 | 2.52 | 0.47 | 24.60 | 74.13 |
| 12 | 7.2 | 3.20 | 2.4 | 2.58 | 1.00 | 0.44 | 82.20 | 272.61 |
| 16 | 9.6 | 2.72 | 0.8 | 3.54 | 1.00 | 0.29 | 94.05 | 829.61 |
| 20 | 16.0 | 14.40 | 9.6 | 7.61 | 6.81 | 4.43 | 21.20 | 2865/81 |

Linked Multiple Unit Robotic Cell (LMURC)

In order to increase the throughput of cell 10, some of the adjacent stations 18 may be linked by local material handling devices that transfer wafers between those stations 18. Thus, robot 14 need not perform these particular transfers. If two stations 18 are linked in this way, they have an equal number of processing units. That is, each processing unit of the first station 18 in the pair is linked to a corresponding processing unit of second station 18 in the pair. Cell 10 may implement linked multiple unit robotic cells when the throughput rate of cell 10 is constrained by the ability of robot 14. By linking selected stations 18, the workload of robot 14 can be reduced.

Two stations $S_i$ and $S_{i+1}$, are said to be a linked pair if a local material handling device transfers the processed wafer from station $S_i$ to $S_{i+1}$. In this case, robot 14 need not transfer the processed wafer from $S_i$ to $S_{i+1}$. For our analysis of cell 10, we assume that if stations $S_i$ to $S_{i+1}$ are linked then stations $S_{i+1}$ and $S_{i+2}$ (also $S_{i+1}$ and $S_i$) are not linked.

As an example of cell 10 in a linked multiple unit robotic cell configuration, consider cell 10 having m=4 with one processing unit at each station 18, and stations $S_2$ and $S_3$ linked. In this case, the material handling between stations $S_2$ and $S_3$ is performed by an integrated material handling device, and robot 14 need not perform the material handling operation between the linked stations 18. Therefore, the loading operation on the second station 18 of the linked pair ($S_3$) does not appear in the robot move cycle. If each station 18 consists of one processing unit, then there are six one-unit cycles, as shown below:

$C'_{1,4}: \{S_4^+, S_1^-, S_2^-S_4^-, S_4^+\} \quad C'_{2,4}: \{S_4^+, S_1^-, S_4^-S_2^-, S_4^+\}$ $C'_{3,4}: \{S_4^+, S_4^-, S_1^-S_2^-, S_4^+\} \quad C'_{4,4}: \{S_4^+, S_2^-, S_4^-S_1^-, S_4^+\}$ $C'_{5,4}: \{S_4^+, S_2^-, S_1^-S_4^-, S_4^+\} \quad C'_{1,4}: \{S_4^+, S_1^-, S_2^-S_4^-, S_4^+\}$ Note that $S_3^-$ (loading on second station of the linked pair) does not appear in any of the above cycles. If some of these stations 18 have multiple identical processing units, then an LCM-unit cycle can be constructed similar to the one shown above.

Cycle Time Derivation for LMURC

Cycle time derivation for LMURC is slightly different from that of single and multiple unit robotic cells, because the material handing between linked station pairs is not done by robot 14. In the case of linked station pairs, robot 14 loads wafers at the first station 18 of the pair and unloads from the second station 18. Since robot 14 does not move the wafer from the first station 18 to the second station 18 of the pair, it is possible that robot 14 may have to wait before loading a wafer on the first station 18 of the linked pair until the previously loaded wafer moves from the first station 18 to the second station 18 through an integrated material handling device. Therefore, we define $W'_i$ as the waiting time of robot 14 before loading a wafer at station $S_i$, where station $S_i$ is the first station of a linked pair. In addition, $Y_{i,i+1}$ denotes the wafer move time between linked stations $S_i$ and $S_{i+1}$. Let $z_i$ denote the waiting time of the wafer after the processing is completed at the first station of the linked pair $S_i$ before it is transferred to $S_{i+1}$.

Let us consider an example of m=4 with one processing unit at each station 18, and stations $S_2$ and $S_3$ are linked. Starting from the initial state where robot 14 has just unloaded a wafer from $S_4$, robot move cycle $C'_{4,4}: \{S_4^+, S_2^-, S_4^-, S_1^-, S_4^+\}$ includes the following activities: move to O: ($t_{4,5}$), drop the wafer: ($l_5$), move to $S_1$: ($t'_{5,1}$), if necessary wait for the wafer to be processed on $S_1$: ($w_1$), unload: ($u_1$), move to $S_2$: ($t'_{1,2}$), if necessary wait before loading (because if is the first station of the linked pair): ($w'_2$) and load: ($l_2$), move to $S_3$: ($t'_{2,3}$), if necessary wait for the wafer: ($w_3$), unload: ($u_3$), move to $S_4$: ($t_{3,4}$), and load: ($l_4$), move to I: ($t'_{4,0}$), pick up a wafer: ($u_0$), move to $S_1$: ($t_{0,1}$), load: ($l_1$), move to $S_4$: ($t'_{1,4}$), if necessary wait for the wafer: ($w_4$), unload: ($u_4$). Therefore, the cycle time, $$T = t_{4,5} + l_5 + t'_{5,1} + w_1 + u_1 + t_{1,2} + w'_2 + l_2 + t'_{2,3} + w_3 + u_3 + t_{3,4} + l_4 + t'_{4,0} + u_0 + t_{0,1} + l_1 + t'_{1,4} + w_4 + u_4$$

When robot 14 comes to unload the wafer at station 18, robot 14 waits for the wafer if the wafer is still being processed. Hence, $w_1 = \max\{0, p_1 - t'_{1,4} - w_4 - u_4 - t_{4,5} - l_5 - t'_{5,1}\}$ and $w_1 = \max\{0, p_4 - t'_{4,0} + u_0 - t_{0,1} - l_1 - t'_{1,4}\}.$ Note that $w_2$ does not appear in the cycle time equation because robot 14 does not transfer wafer between $S_2$ and $S_3$. Instead, $w'_2$ appears in the cycle time equation, which is the robot's waiting time before loading the wafer on $S_2$.

In order to find the equations for $w'_2$ and $w_3$, we define the state of the linked pair when robot 14 moves to $S_2$ to load a wafer on it. At that time, both stations 18 of the linked pair cannot have a wafer. Therefore, the possible states at that time are: (i) a wafer on one of stations 18 in the linked pair, or (ii) both of stations 18 in the linked pair are empty. If the linked pair is in first state, we say it is in the loaded state, and if it is in second state, it is said to be in the free state.

Let us find the equations for $w'_2$ and $W_3$ when the linked pair is in the loaded state. Recall that $z_2$ denotes the time wafer waits on $S_2$, after being processed, to be transferred to $S_3$ through the integrated material handling device. Robot 14 can load the wafer on $S_2$ only if the previously processed wafer on $S_2$ has been transferred to $S_3$. Note that the previous wafer was loaded on $S_2$ in the previous cycle.

Therefore, $$w'_2 = \max\{0, p_2+z_2-t'_{2,3}-w_3-u_3-t_{3,4}-l_4-t'_{4,0}-u_0-t_{0,1}-l_1-t'_{1,4}-w_4-u_4-t_{4,5}-l_5-t'_{5,1}-w_1-u_1-t_{1,2}\}$$

In this case, when robot 14 comes to load a wafer at $S_2$, there is always one wafer somewhere in the linked pair. Therefore, any wafer loaded on $S_2$ is unloaded from $S_3$ only after another wafer has been loaded on $S_2$. Hence, $$w_3 = \max\{0, p_2+z_2+y_{2,3}+p_3-T-t'_{2,3}\}$$

Substituting the equation of T into the equation for $w_3$ and simplifying, we get $$2w_3 = \max\{0, p_2+z_2+y_{2,3}+p_3-t_{4,5}-l_5-t'_{5,1}-w_3-u_1-t_{1,2}-w'_2-l_2-2't_{2,3}-u_3-t_{3,4}-l_4-t'_{4,0}-u_0-t_{0,1}-l_1-t'_{1,4}-w_4-u_4\}.$$

After loading a new wafer (say $P_2$) on $S_2$, robot 14 moves to $S_3$. If the previously loaded wafer (say $P_1$) is not processed on $S_3$, robot 14 waits there and then unloads $P_1$. Therefore, the processed wafer $P_2$ on $S_3$ has to wait ($z_2$) until robot 14 has unloaded the previously loaded wafer $P_1$ from $S_3$. Hence, $$z_2 = \max\{0, t'_{2,3}+w_3+u_3-p_2-y_{2,3}\}$$

Similar to the linear program discussed above, a steady state solution can be found using the following linear program called LP2(load) as follows:

Linear Program LP2(load):

Min $T = t_{4,5}+l_5+t'_{5,1}+w_1+u_1+t_{1,2}+w'_2+l_2t'_{2,3}+w_3+u_3+t_{3,4}+l_4+t'_{4,0}+u_0+t_{0,1}+l_1+t'_{1,4}+w_4+u_4$

S.t $w_1 \geq p_1-t'_{1,4}-w_4-u_4-t_{4,5}-l_5-t'_{5,1}$ $w_4 \geq p_4-t'_{4,0}-u_0-t_{0,1}-l_1-t'_{1,4}$ $w'_2 \geq p_2+z_2-t'_{2,3}-w_3-u_3-t_{3,4}-l_4-t'_{4,0}-u_0-t_{0,1}-l_1-t'_{1,4}-w_4-u_4-t_{4,5}-l_5-t'_{5,1}-w_1-u_1-t_{1,2}$ $2w_3 \geq p_2+z_2+y_{2,3}p_3-t_{4,5}-l_5-t'_{5,1}-w_1-u_1-t_{1,2}-w'_2-l_2-2t'_{2,3}-u_3-t_{3,4}-l_4-t'_{4,0}-u_0-t_{0,1}-l_1-t'_{1,4}-w_4-u_4$ $z_2 \geq t'_{2,3}+w_3+u_3-p_2-y_{2,3}$ $z_2, w_1, w'_2, w_3, 24 \geq 0$ Let us call the linear program formulation for the free state linked pair as LP2(free). In this case, the equations for T, $w_1$ and $w_4$ remain same as LP2(load). The other equations are:

$w'_2 z_2 = 0$ and $w_3 \geq p_2+y_{2,3}+p_3-t'_{2,3}$.

Therefore, for a given robot move cycle and linked pairs state, the cycle time can be calculated by constructing and solving a linear program similar to that of LP2(load) or LP2(free).

Genetic Algorithm for LMURC

Since the cycle time calculation requires the robot move cycle as well as the linked pairs state, we need to define a two-dimensional chromosome with one dimension as the robot move cycle and the other dimension as linked pairs state. For the same example discussed above with respect to cycle time derivation in LMURC and given robot move cycle $C'_{4,4}$, if the linked pair is in loaded state, then the chromosome representation is as shown in Table 8.

TABLE 3

Chromosome Representation for LMURC

| 2 | 4 | 1 |
|---|----|----|
| 1 | -1 | -1 |

The first row in Table 3 shows the loading sequence which is same as single and multiple unit robotic cells. The second row shows the linked pairs state correspondingly. If any station is not linked, then it's representation in second row is always negative one. Note that only the first station of the linked pair appears in the first row, as the robot does not load the second station of the linked pair. If the linked pair is in a loaded state, then the column corresponding to the first station of the linked pair contains a one in the second row, otherwise it contains zero. Because of the changes in the chromosome used for linked multiple unit robotic cells when compared to the earlier chromosomes, the crossover and mutation operators differ slightly.

Figure 4:
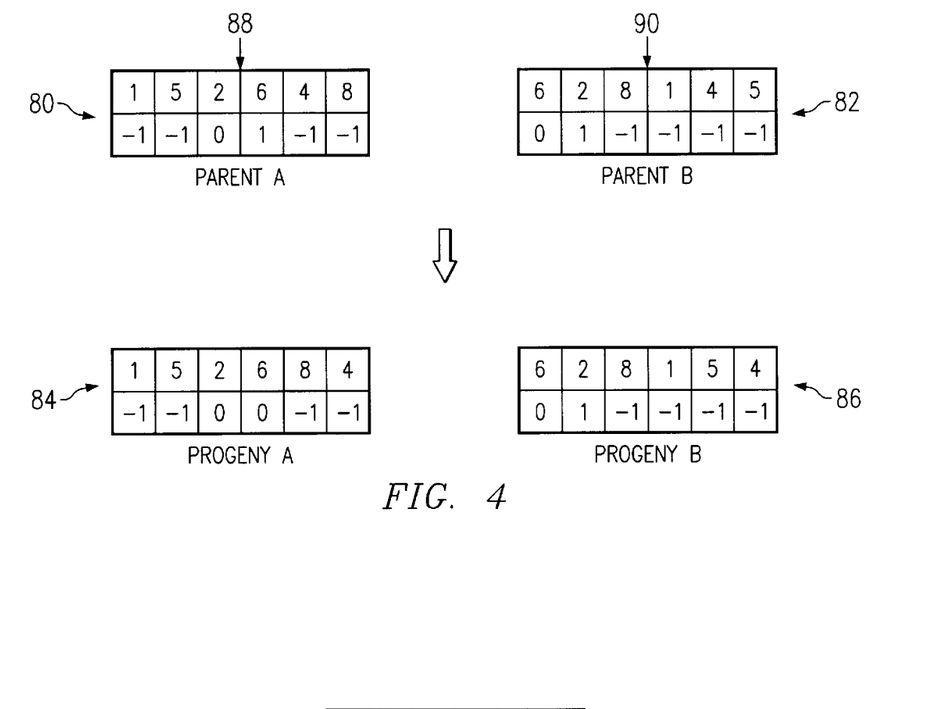
FIG. 4 is a diagram illustrating another crossover operation performed by the controller.

FIG. 4 illustrates a crossover operation of controller 12 for cell 10 implementing a linked multiple unit robotic cell. For this illustration, m=8 and the linked stations pairs are $S_2$–$S_3$ and $S_6$–$S_7$. In this illustration, controller 12 uses one-point crossover between two parents to produce two progeny. In this illustration, controller 12 crosses over a parent A, indicated at 80, and a parent B, indicated at 82, to produce progeny A, indicated at 84, and progeny B, indicated at 86. For this process, controller 12 first randomly selects the crossover point, in this example, the third column, as indicated at 88 and 90. Then, controller 12 gives progeny A the first three columns from parent A in order. Similarly, controller 12 gives progeny B the first three columns from parent B in order. In progeny A, controller 12 fills the first row of the three remaining columns with stations 6-8-4 in order from parent B, and fills the second row with corresponding values. Similarly, for progeny B, controller 12 fills the first row of the three remaining columns by the stations 1-5-4 in order from parent A, and fills the second row with corresponding values.

Figure 5:
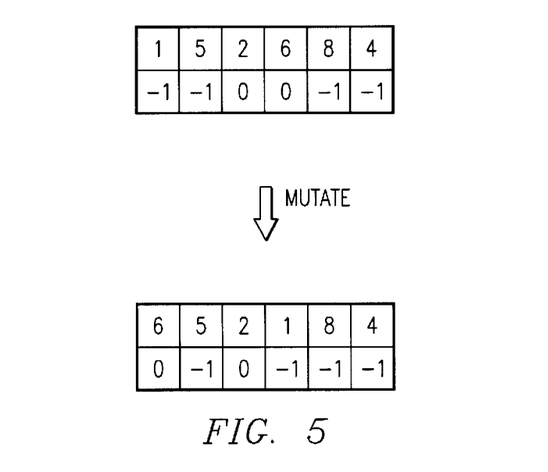
FIG. 5 is a diagram illustrating a mutation operation performed by the controller.

FIG. 5 illustrates an exemplary mutation operation performed on progeny A created in the example above. In this example, controller 12 uses an arbitrary two-column change mutation. For the two-column mutation, controller 12 randomly selects two columns. In this example, controller 12 has selected the first and fourth columns. Controller 12 then swaps the values from these two columns. However, while these examples illustrate a particular mutation and crossover operation, cell 10 contemplates controller 12 using any suitable techniques for performing mutation and crossover operations.

Computational Studies for LMURC

This analysis considers the same problems as tested for multiple unit robotic cells, but links some of the adjacent stations 18. Table 4 shows the results for randomly generated problems. We observe that the increase in average number of wafers/shift (3 to 37 wafers/shift) and the average percentage improvements (0.8 to 7.5%) are significant.

TABLE 4

Improvements using GA over LWP for random dataset in LMURC

| Number of Stations | Increase in number of wafers/shift using GA over LWP | | | % improvement using GA over LWP | | | Avg CPU Time for LWP | Avg CPU Time for GA |
|---|---|---|---|---|---|---|---|---|
| (m) | Max | Avg | Min | Max | Avg | Min | (in sec.) | (in sec.) |
| 8 | 61.6 | 37.12 | 3.2 | 13.90 | 7.45 | 0.50 | 50.6 | 121.37 |
| 12 | 7.2 | 2.88 | 0 | 2.58 | 0.81 | 0 | 64.8 | 299.64 |
| 16 | 24.0 | 6.72 | 0 | 9.18 | 2.35 | 0 | 67.6 | 429.72 |
| 20 | 24.8 | 18.40 | 13.6 | 8.86 | 6.54 | 4.67 | 75.0 | 705.28 |

Figure 6:
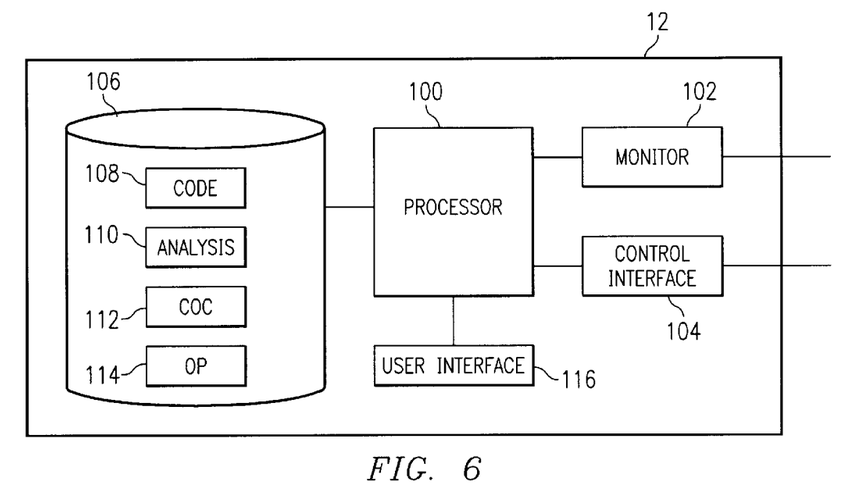
FIG. 6 is a block diagram illustrating the controller from the manufacturing system.

FIG. 6 illustrates functional modules for a particular embodiment of controller 12, which includes a processor 100, a monitor 102, a control interface 104, and a memory 106. In the embodiment illustrated, memory 106 maintains code 108, analysis logic 110, cell operating characteristics 112, and optimization parameters 114. To interface with users, controller 12 further includes a user interface 116. In general, controller 12 provides for the control of robot 14 and attempts to maximize throughput of cell 10. According to particular embodiments, controller 12 uses a genetic analysis process, such as the process detailed, to identify a control schedule for use by robot 14.

Processor 100 controls the management and operation of elements of controller 12. For example, processor 100 may be a microcontroller, processor, programmed logic device, and/or other suitable processing device. Monitor 102 monitors the operation of elements within cell 10. For example, monitor 102 may continuously, periodically, or sporadically check the operating characteristics of robot 14 and stations 18 within cell 10. Based on the activities of monitor 102, processor 100 can maintain current information within memory 106. To provide control schedules to robot 14, controller 12 includes control interface 104. However, while illustrated as a separate interface from monitor 102, these modules may share a common link to other elements within cell 10.

Within controller 12, memory 106 maintains information for use during operation. Code 108 represents software and/or other suitable controlling logic for use by other elements, such as processor 100, during operation. Analysis module 110 represents software and/or other suitable logic implementing routines for determining a control schedule for use by robot 14. For example, analysis module 110 may implement a genetic algorithm, such as the algorithms detailed above. Cell operating characteristics 112 include pre-configured and/or measured parameters describing the performance of elements of cell 10. For example, cell operating characteristics 112 may indicate values for many of the variable discussed above, such as robot move times and times for tasks associated with stations 18. Optimization parameters 114 include values for use by analysis module 110 during operation. For example, optimization parameters 114 may indicate values for parameters detailed above, such as population size and elite fraction.

During operation, controller 12 may receive information from users and provide feed on operation through user interface 116. Thus, user interface 116 represents any suitable hardware and controlling logic, such as a keyboard, mouse, and display. Through user interface 116, an administrator can specify information such as cell operating characteristics 112 and optimization parameters 114. User interface 116 further permits administrators to monitor the operation cell 10 and of controller 12 in developing effective control schedules for robot 14.

In addition to providing for control of robot 14, controller 12 may also provide for analysis of the operation of an actual or proposed robotic cell under various conditions. For example, using controller 12, an administrator can perform sensitivity analysis on the effect on throughput of various potential design changes for robotic cells, such as increasing the processing capacity at some stations and reducing processing requirements at some stations. Therefore, controller 12 potentially provides both a control system and an analysis platform.

According to particular embodiments, controller 12 provides system control for a semiconductor manufacturing process, such as a photolithography process. During a photolithography process, processing stations 18 perform a series of steps to transfer electronic circuit patterns onto a wafer. Coating is the first operation, in which the wafer is coated with a photo-resist material. The wafer is then baked in order to firm the photo-resist and to improve its adhesion to the wafer. Then it is sent to an aligner or a stepper for exposure. In the stepper, a reticle—a template containing the pattern for only one chip-is placed on the wafer and exposed to ultraviolet (UV) light. The alignment and exposure process, which constitutes a step, is repeated until the whole wafer surface is exposed. Each layer uses a different mask/reticle specifically designed for that layer's device characteristics. Development is the next operation in which the exposed photo-resist is removed by the application of a special solvent. Finally, the wafer goes through a final bake step to ensure that the unexposed photo-resist adheres to the wafer. To automate this process, robot 14 shuttles the wafer between processing stations 18 that implement the stages of the photolithography process.

However, while the control techniques described are applicable to semiconductor manufacturing processes, the disclosed techniques may be used to increase throughput for any appropriate automated system. Moreover, while the embodiment illustrated and the preceding description focus on a particular embodiment of controller 12 that includes specific elements, cell 10 contemplates controller 12 having any suitable combination and arrangement of elements for determining control schedules for one or more robots 14. Thus, the modules and functionalities described may be combined, separated or otherwise distributed among any suitable functional components, and controller 12 may implement some or all of the functionalities described using logic encoded in media, such as software or programmed logic devices.

Figure 7:
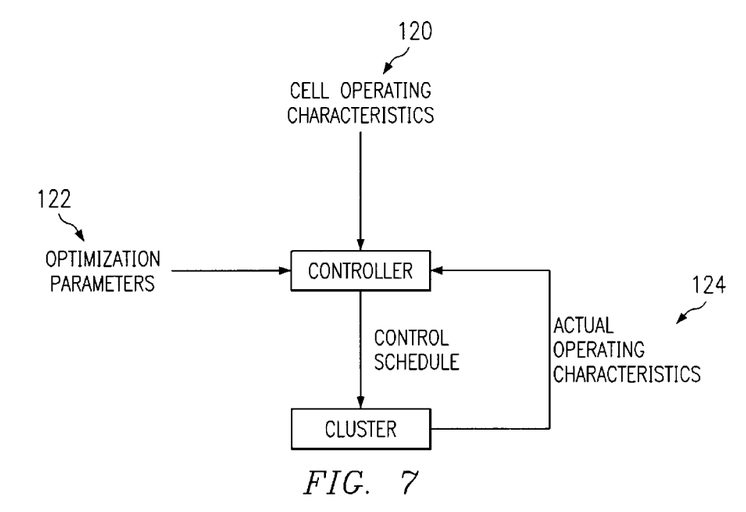
FIG. 7 is a data flow diagram illustrating information exchange between elements of the manufacturing system.

FIG. 7 illustrates a dynamic feedback process in which controller 12 monitors actual operating characteristics of elements within a "cluster" under its control, that is, robot 14, input 16, stations 18, and output 20. Because controller 12 provides for monitoring of the operation of cell 10, this permits controller 12 to dynamically update the control schedule used by robot 14 according to actual operating characteristics of cell 10. As shown by FIG. 7, controller 12 initially receives cell operating characteristics and optimization parameters, as indicated at 120 and 122 respectively. Controller 12 then generates a control schedule based on this information. Using monitor 102, controller 12 monitors the actual operating characteristics of the cluster, as indicated at 124. This enables controller 12 to update the control schedule used by robot 14 to reflect the actual operations within the various elements of cell 10.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A method for calculating a control schedule for a robot within a fabrication system, the method comprising:

determining operating characteristics for steps in a fabrication process, the operating characteristics comprising a robot movement matrix for movements between a plurality of processing stations and processing times for each of the processing stations;

identifying a plurality of control schedules each detailing a process for a robot to shuttle wafers between the processing stations;

determining fitness for each of the control schedules using the operating characteristics;

mating the control schedules according to the fitness determined for each control schedule to create a resulting generation of control schedules;

iterating the fitness determining and the mating for a plurality of resulting generations;

selecting a chosen control schedule from a final one of the resulting generations based on fitness; and operating the robot according to the chosen control schedule.

2. The method of claim 1, further comprising:

monitoring actual operating characteristics of the robot and of the processing stations;

re-performing the fitness determining, mating, iterating, and selecting to identify an updated chosen control schedule; and operating the robot according to the updated chosen control schedule.

3. The method of claim 1, wherein each of the control schedules specifies a one-unit cycle of robot actions such that the robot actions result in processing of one wafer in steady-state, and wherein the fitness of each of the control schedules indicates cycle time for the control schedule.

4. The method of claim 1, wherein:

at least one of the processing stations comprises a plurality of processing units, and each of the control schedules specifies a one-unit cycle of robot actions;

determining the fitness of each of the control schedules comprises constructing a least common multiple unit cycle from the control schedule and calculating fitness of the least common multiple unit cycle; and operating the robot according to the chosen control schedule comprises operating the robot according to the least common multiple unit cycle corresponding to the chosen control schedule.

5. The method of claim 1, further comprising, prior to each mating of a generation:

identifying an elite portion of the generation using fitness of each of the control schedules in the generation;

discarding all of the control schedules from the generation that are not in the elite portion; and replicating the elite portion of the control schedules according to relative fitness of each of the control schedules to increase the number of control schedules in the generation to an original population size.

6. The method of claim 1, wherein the fitness of a control schedule indicates the amount of time to complete the control schedule, and wherein the chosen control schedule results in the smallest amount of time as compared to other control schedules in any of the resulting generations.

7. The method of claim 1, wherein the processing stations comprise a series of stages for execution in a specified order to perform photolithography of a semiconductor wafer, the processing stations comprising a coating station, a baking station, an ultraviolet exposure station, and a development station.

8. The method of claim 1, wherein the operating characteristics further comprise, for each of the processing stations, a time for the robot to load a wafer at the processing station and a time for the robot to unload a wafer at the processing station, and wherein the robot movement matrix indicates movement time for the robot between the processing stations based on whether or not the robot currently is loaded with a wafer.

9. The method of claim 1, wherein each of the control schedules specifies a sequence of alleles, each of the alleles indicating one of the stations for the robot to service.

10. The method of claim 9, wherein mating a generation of control schedules comprises performing the following steps a plurality of times:

identifying a first control schedule and a second control schedule from the generation;

selecting a crossover point;

creating a first progeny having alleles identical to the first control schedule up to the crossover point;

reordering remaining alleles of the first progeny in the order in which the remaining alleles appear in the second control schedule;

creating a second progeny having alleles identical to the second control schedule up to the crossover point; and reordering remaining alleles of the second progeny in the order in which the remaining alleles appear in the first control schedule.

11. A wafer fabrication system comprising:

a plurality of processing stations;

a system controller operable to determine operating characteristics for steps in a fabrication process, the operating characteristics comprising a robot movement matrix for movements of a robot between the processing stations and processing times for each of the processing stations, to system controller further operable to identify a plurality of control schedules each detailing a process for the robot to shuttle wafers between the processing stations, to determine fitness for each of the control schedules using the operating characteristics, to mate the control schedules according to the fitness determined for each control schedule to create a resulting generation of control schedules, to iterate the fitness determining and the mating for a plurality of resulting generations, and to select a chosen control schedule from a final one of the resulting generations based on fitness; and the robot operable to service the processing stations according to the chosen control schedule.

12. The system of claim 11, wherein:

the system controller is further operable to monitor actual operating characteristics of the robot and of the processing stations and to re-perform the fitness determining, mating, iterating, and selecting to identify an updated chosen control schedule; and the robot is further operable to service the processing stations according to the updated chosen control schedule.

13. The system of claim 11, wherein each of the control schedules specifies a one-unit cycle of robot actions such that the robot actions result in processing of one wafer in steady-state, and wherein the fitness of each of the control schedules indicates cycle time for the control schedule.

14. The system of claim 11, wherein:

at least one of the processing stations comprises a plurality of processing units, and each of the control schedules specifies a one-unit cycle of robot actions;

the system controller is further operable to determine the fitness of each of the control schedules by constructing a least common multiple unit cycle from the control schedule and calculating fitness of the least common multiple unit cycle; and the robot services the processing stations according to the chosen control schedule using the least common multiple unit cycle corresponding to the chosen control schedule.

15. The system of claim 11, wherein the system controller is further operable, prior to each mating of a generation, to:

identify an elite portion of the generation using fitness of each of the control schedules in the generation;

discard all of the control schedules from the generation that are not in the elite portion; and replicate the elite portion of the control schedules according to relative fitness of each of the control schedules to increase the number of control schedules in the generation to an original population size.

16. The system of claim 11, wherein the fitness of a control schedule indicates the amount of time to complete the control schedule, and wherein the chosen control schedule results in the smallest amount of time as compared to other control schedules in any of the resulting generations.

17. The system of claim 11, wherein the processing stations comprise a series of stages for execution in a specified order to perform photolithography of a semiconductor wafer, the processing stations comprising a coating station, a baking station, an ultraviolet exposure station, and a development station.

18. The system of claim 11, wherein the operating characteristics further comprise, for each of the processing stations, a time for the robot to load a wafer at the processing station and a time for the robot to unload a wafer at the processing station, and wherein the robot movement matrix indicates movement time for the robot between the processing stations based on whether or not the robot currently is loaded with a wafer.

19. The system of claim 11, wherein each of the control schedules specifies a sequence of alleles, each of the alleles indicating one of the stations for the robot to service.

20. The system of claim 19, wherein the system controller mates a generation of control schedules by performing the following steps a plurality of times:

identifying a first control schedule and a second control schedule from the generation;

selecting a crossover point;

creating a first progeny having alleles identical to the first control schedule up to the crossover point;

reordering remaining alleles of the first progeny in the order in which the remaining alleles appear in the second control schedule;

creating a second progeny having alleles identical to the second control schedule up to the crossover point; and reordering remaining alleles of the second progeny in the order in which the remaining alleles appear in the first control schedule.

21. Logic for calculating a control schedule for a robot within a fabrication system, the logic encoded in media and operable when executed to perform the steps of:

determining operating characteristics for steps in a fabrication process, the operating characteristics comprising a robot movement matrix for movements between a plurality of processing stations and processing times for each of the processing stations;

identifying a plurality of control schedules each detailing a process for a robot to shuttle wafers between the processing stations;

determining fitness for each of the control schedules using the operating characteristics;

mating the control schedules according to the fitness determined for each control schedule to create a resulting generation of control schedules;

iterating the fitness determining and the mating for a plurality of resulting generations;

selecting a chosen control schedule from a final one of the resulting generations based on fitness; and providing the chosen control schedule to the robot to control operation of the robot.

22. The logic of claim 21, further operable when executed to perform the steps of:

monitoring actual operating characteristics of the robot and of the processing stations;

re-performing the fitness determining, mating, iterating, and selecting to identify an updated chosen control schedule; and operating the robot according to the updated chosen control schedule.

23. The logic of claim 21, wherein each of the control schedules specifies a one-unit cycle of robot actions such that the robot actions result in processing of one wafer in steady-state, and wherein the fitness of each of the control schedules indicates cycle time for the control schedule.

24. The logic of claim 21, wherein at least one of the processing stations comprises a plurality of processing units, and each of the control schedules specifies a one-unit cycle of robot actions, the logic further operable when executed to perform the steps of:

determining the fitness of each of the control schedules by constructing a least common multiple unit cycle from the control schedule and calculating fitness of the least common multiple unit cycle; and providing the least common multiple unit cycle corresponding to the chosen control schedule to the robot to control operation of the robot.

25. The logic of claim 21, further operable when executed to perform, prior to each mating of a generation, the steps of:

identifying an elite portion of the generation using fitness of each of the control schedules in the generation;

discarding all of the control schedules from the generation that are not in the elite portion; and replicating the elite portion of the control schedules according to relative fitness of each of the control schedules to increase the number of control schedules in the generation to an original population size.

26. The logic of claim 21, wherein the fitness of a control schedule indicates the amount of time to complete the control schedule, and wherein the chosen control schedule results in the smallest amount of time as compared to other control schedules in any of the resulting generations.

27. The logic of claim 21, wherein the processing stations comprise a series of stages for execution in a specified order to perform photolithography of a semiconductor wafer, the processing stations comprising a coating station, a baking station, an ultraviolet exposure station, and a development station.

28. The logic of claim 21, wherein the operating characteristics further comprise, for each of the processing stations, a time for the robot to load a wafer at the processing station and a time for the robot to unload a wafer at the processing station, and wherein the robot movement matrix indicates movement time for the robot between the processing stations based on whether or not the robot currently is loaded with a wafer.

29. The logic of claim 21, wherein each of the control schedules specifies a sequence of alleles, each of the alleles indicating one of the stations for the robot to service.

30. The logic of claim 29, further operable when executed to mate a generation by performing, a plurality of times, the steps of:

identifying a first control schedule and a second control schedule from the generation;

selecting a crossover point;

creating a first progeny having alleles identical to the first control schedule up to the crossover point;

reordering remaining alleles of the first progeny in the order in which the remaining alleles appear in the second control schedule;

creating a second progeny having alleles identical to the second control schedule up to the crossover point; and reordering remaining alleles of the second progeny in the order in which the remaining alleles appear in the first control schedule.

* * * * *

UNITED STATES PATENT AND TRADEMARK OFFICE
CERTIFICATE OF CORRECTION

PATENT NO. : 6,556,893 B2
DATED : April 29, 2003
INVENTOR(S) : Subodha Kumar

It is certified that error appears in the above-identified patent and that said Letters Patent is hereby corrected as shown below:

Title page,
Item [73], Assignees, delete "FSI International, Allen, Texas (US);" and insert -- FSI International, Inc., Chaska, MN (US); --.

Column 3,
Line 66, delete "$S_{m+1}^-$" and insert -- $S^-_{m+1}$ --.

Column 4,
Line 45, after "station", delete "$S_{i+1}^+$" and insert -- $S^-_{i+1}$, --.
Line 47, after "cycle.", delete "$S_{m+1}^-$" and insert -- $S^-_{m+1}$ --.
Line 48, delete "$S_{m+1}^-$" and insert -- $S^-_{m+1}$ --.
Line 52, after "$S_1^-$", delete "$S_2^{31}$" and insert -- $S^-_2$ --.

Column 5,
Line 64, after "load:", delete "(L2)" and insert -- (12) --.
Line 65, after "unload:", delete "($U_2$)", and insert -- ($u_2$) --.
Line 67, after "$t_{0,1}$", insert -- + --.

Column 6,
Line 6, after "I:", delete "$t'_{2,0}$", and insert -- ($t'_{2,0}$) --.
Line 54, after "l", insert -- + --.

Column 7,
Line 17, after "cycle", delete "{$S_6^-$", and insert -- {$S^+_6$ --.
Line 39, after "100,", delete "$P_c$", and insert -- $p_c$ --.

Column 8,
Line 41, after "optimization", delete "paramters", and insert -- parameters --.

Column 11,
Line 30, after "$S_2^-$,", delete "$S_4^{30}$", and insert -- $S^+_4$ --.
Line 32, after "$C^3_{10,4}$," delete "$c_{14,0}^4$" and insert -- $C^4_{10,4}$ --.
Line 41, delete "$C_{10,4}^4$", and insert -- $C^5_{10,4}$ --.
Line 56, delete "{S3-, S2-, S3-, S1-, S3-}", and insert -- $\{S_3^+, S_2^-, S_3^-, S_1^-, S_3^+\}$ --.

Line 63, after "cycle", delete "Γhd x,y", and insert -- Γ x,y --.

UNITED STATES PATENT AND TRADEMARK OFFICE
CERTIFICATE OF CORRECTION

PATENT NO. : 6,556,893 B2
DATED : April 29, 2003
INVENTOR(S) : Subodha Kumar

It is certified that error appears in the above-identified patent and that said Letters Patent is hereby corrected as shown below:

Column 13,
Line 28, after "$S_{i+1}$", delete ",".
Line 60, after "material", delete "handing", and insert -- handling --.

Column 14,
Line 16, after "define", delete "$W'_i$", and insert -- w'i --.
Line 18, after "addition,", delete "$Y_{i,i+1}$", and insert -- $y_{i,i+1}$ --.
Line 32, delete "if", and insert -- it --.
Line 47, after "$t'_{4,0}$", delete "+", and insert -- - --.
Line 61, after "and", delete "$W_3$", and insert -- $w_3$ --.

Column 15,
Line 31, after "$l_2$", insert -- + --.
Line 40, after "$y_{2,3}$", insert -- + --.
Line 50, after "$w'_2$", insert -- = --.

Signed and Sealed this

Eleventh Day of May, 2004

JON W. DUDAS
*Acting Director of the United States Patent and Trademark Office*